United States Patent [19]

Thompson

[11] Patent Number: 5,188,383
[45] Date of Patent: Feb. 23, 1993

[54] USER-COLLAPSIBLE WHEELCHAIR

[76] Inventor: Josephine M. Thompson, Somerset House, 5600 Wisconsin Ave., Chevy Chase, Md. 20815

[21] Appl. No.: 770,477

[22] Filed: Oct. 3, 1991

[51] Int. Cl.⁵ ............................................. B62M 1/14
[52] U.S. Cl. ................................. 280/250.1; 280/42; 280/657; 297/379; 297/423
[58] Field of Search .................. 280/42, 650, 657, 647, 280/250.1, 304.1; 297/378, 379, 423, 466, DIG. 4

[56] References Cited

U.S. PATENT DOCUMENTS

| | | | |
|---|---|---|---|
| 4,457,535 | 7/1984 | Takeuchi et al. | 280/647 |
| 4,542,918 | 9/1985 | Singleton | 280/250.1 |
| 4,592,570 | 6/1986 | Nassiri | 280/250.1 |
| 4,676,519 | 6/1987 | Meier | 280/250.1 |
| 4,721,321 | 1/1988 | Haury et al. | 280/250.1 |
| 4,736,960 | 4/1988 | Batty et al. | 280/250.1 |
| 4,805,931 | 2/1989 | Slasor | 280/250.1 |
| 4,852,899 | 8/1989 | Kueschall | 280/250.1 |
| 5,076,390 | 12/1991 | Haskins | 280/250.1 |
| 5,076,602 | 12/1991 | Robertson | 297/378 |

Primary Examiner—David M. Mitchell
Attorney, Agent, or Firm—McAndrews, Held & Malloy, Ltd.

[57] ABSTRACT

A wheelchair that is light in weight and collapsible has drive wheels that are readily removed to reduce its weight and enable a handicapped person or other user to fold it up while the user is in a sitting position. The user may readily change it from a conventional wheelchair to an invalid's caster chair and back. The wheelchair has a fabric seat, seat back, and leg support to reduce its weight, make it inexpensive to manufacture, and make it easy to collapse, and it has no arms to make it easier for a handicapped person to get into and out of the wheelchair.

10 Claims, 3 Drawing Sheets

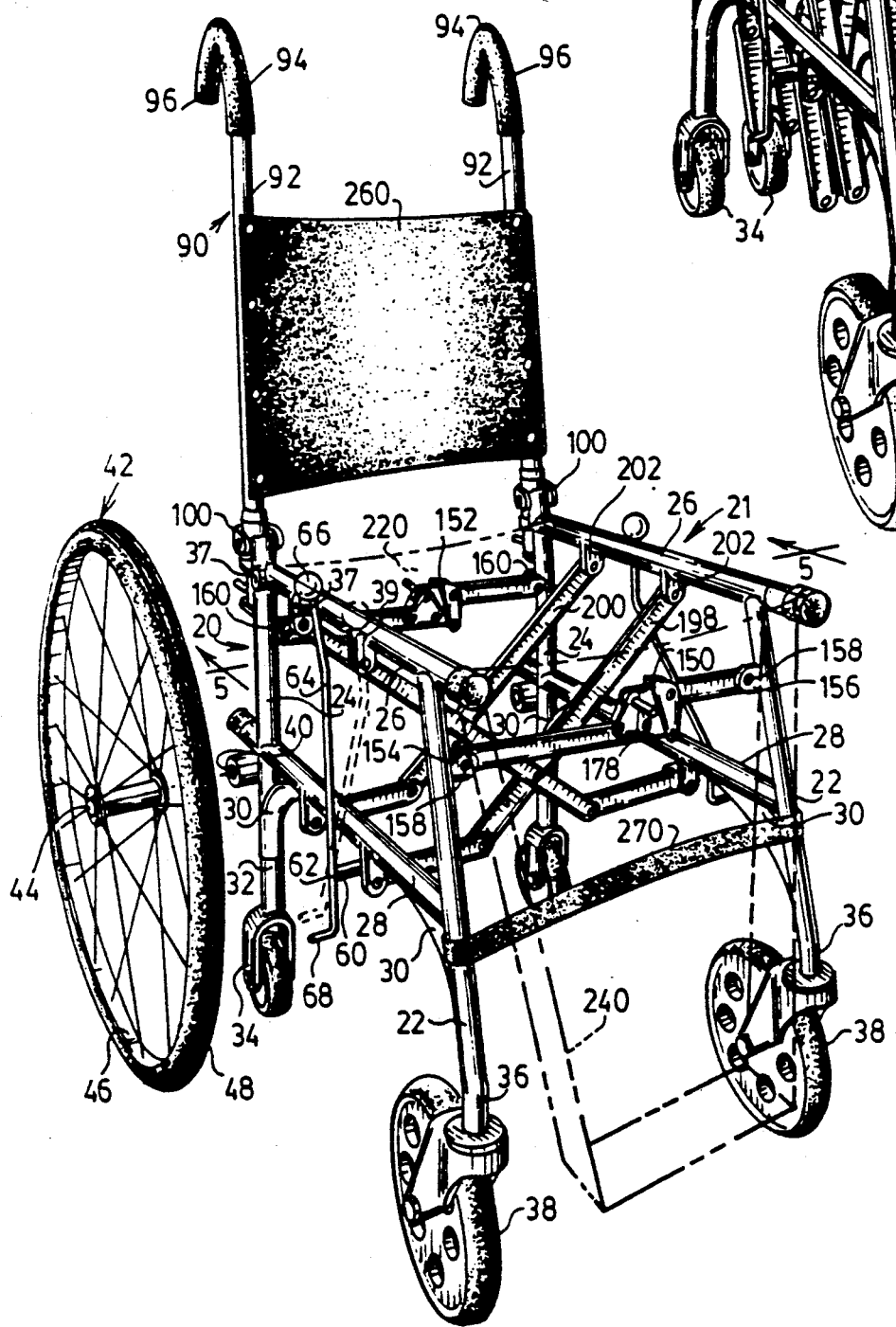

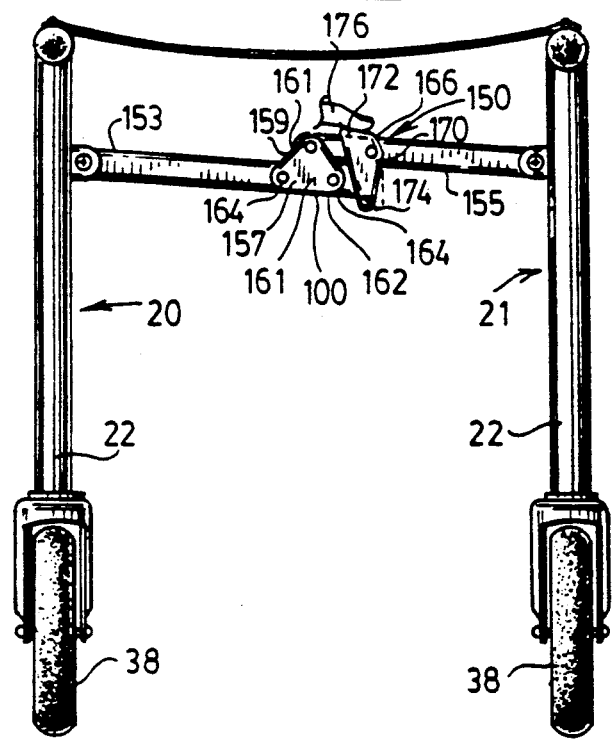
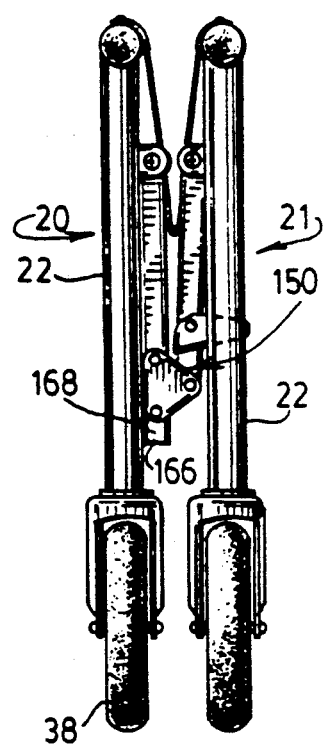
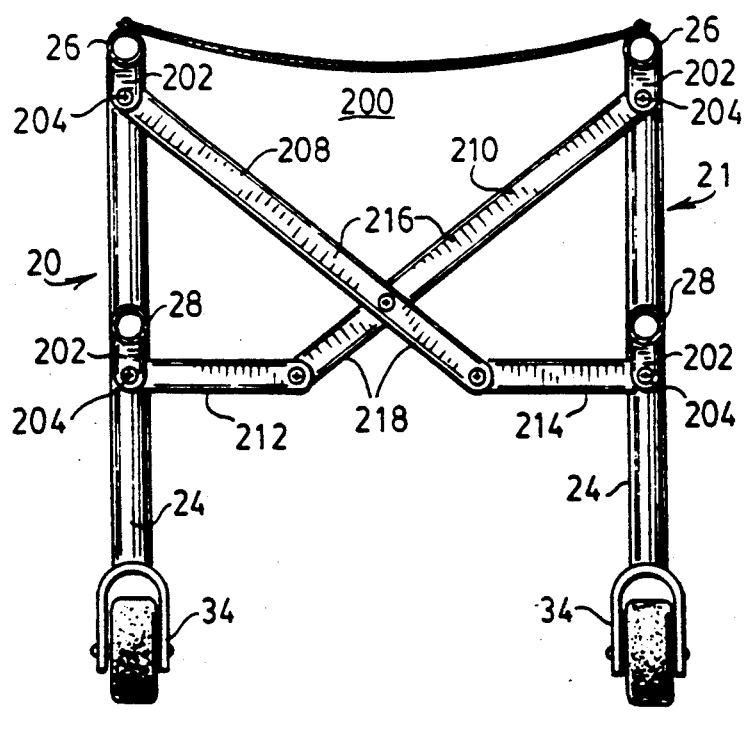
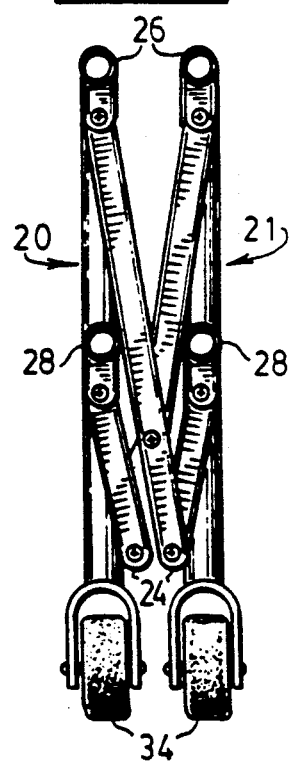

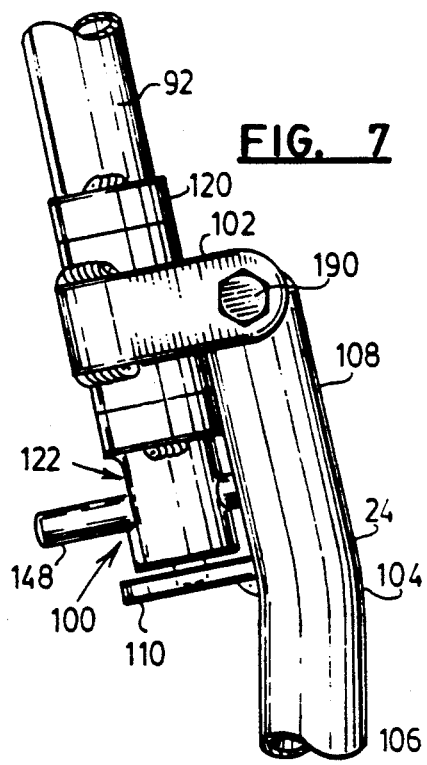
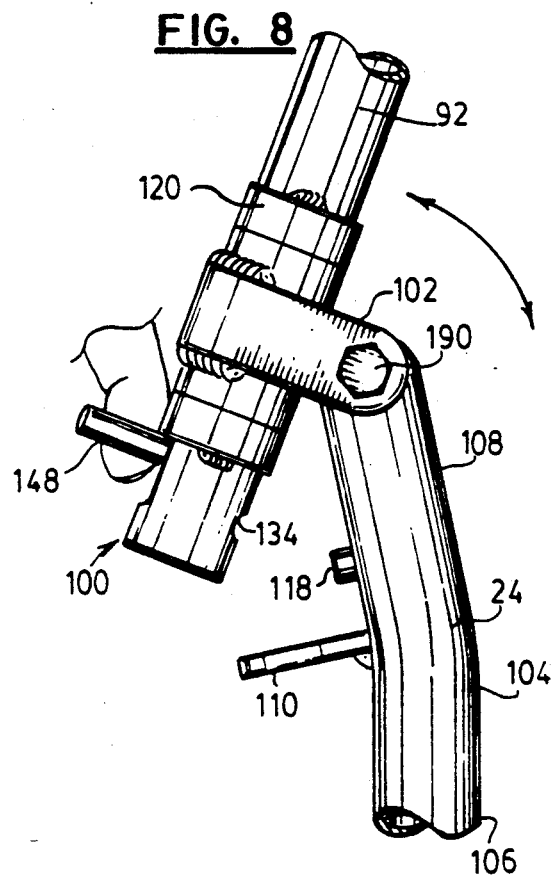
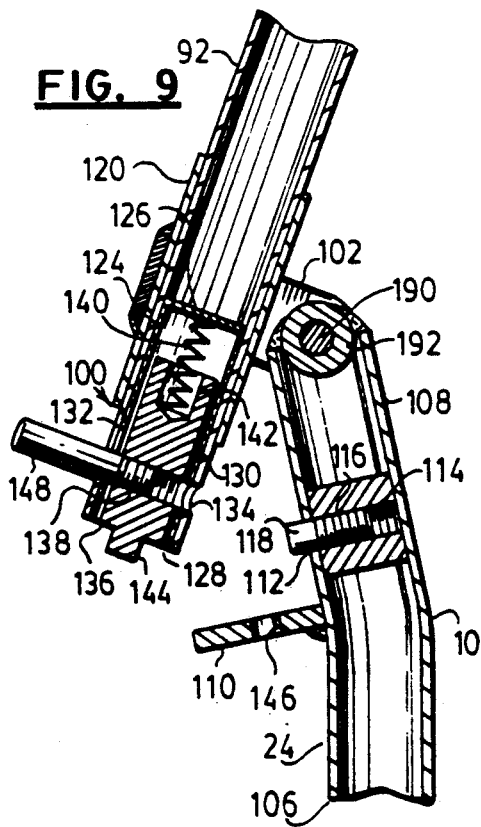
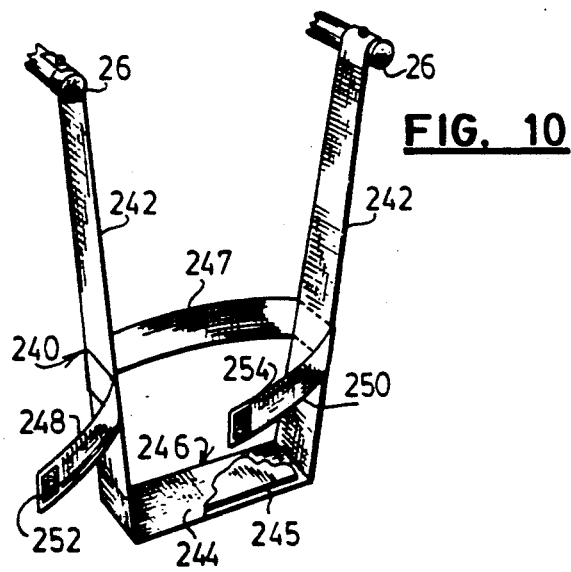
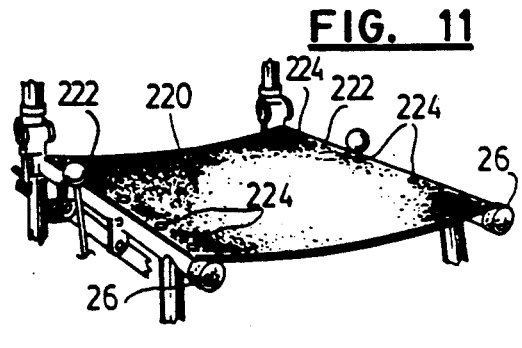

USER-COLLAPSIBLE WHEELCHAIR

BACKGROUND OF THE INVENTION

This invention is an improved wheelchair that can be collapsed and unfolded by a seated user and stored in a limited space such as the overhead luggage carrier of an airplane, and that is readily converted by the seated user or another person into a caster chair.

Handicapped persons differ greatly in their ability to get about. Some may be incapable of walking and thus confined to wheelchairs, while others may be partially ambulatory. Moreover, the mobility of a handicapped person may vary throughout the course of the handicap, week by week or even day by day, and the quality of life for such a person is affected greatly by his or her mobility.

Wheelchairs are commonly used by such persons to increase their mobility, either alone or with the assistance of others. Many conventional wheelchairs are easily collapsible but are characterized by heavy-duty construction to provide safe and stable transport for persons of different weights and sizes over varying terrain. As a result, the wheelchair user will typically require the assistance of another to collapse a wheelchair and load it into and unload it from a car for storage purposes. A further inconvenience is that the typical wheelchair is not easily folded by an unassisted wheelchair user. The typical wheelchair is too large to go through the doorways of many residential bathrooms, making it very difficult for the wheelchair user to have independent access to the bathroom. Finally, most of these wheelchairs are not adapted for multiple uses.

U.S. Pat. No. 2,561,616, entitled "Convertible Wheel Chair", discloses a conventional wheelchair in which the large drive wheels and front caster wheels may be interchanged to permit easier operation and maneuverability as required by changes of grade and obstacles such as curbs and stairs. This wheelchair has several advantages over conventional prior art wheelchairs, including removable drive wheels and the substitution of casters in their place. The drive wheels are mounted and dismounted by means of axles having internally threaded extensions and thimbles. In the alternative, the drive wheels may be eliminated and replaced with smaller caster wheels to convert the wheelchair to a caster chair. Although this wheelchair has the advantage of convertibility, it requires a time-consuming and dexterity-intensive election of a particular wheel-caster combination, and thus is not readily convertible from one configuration to another by a handicapped user.

The advantage of a caster chair in certain circumstances is disclosed in U.S. Pat. No. 4,052,087, entitled "Foldable Caster Chair for the Handicapped". This patent points out the utility of the foldable caster chair for some uses such as in an office and using a toilet. An objective of the patent is to allow for the rotation of the side arms away from the seating area to allow easier use of toilet facilities.

Wheelchairs have been adapted to be user-adjustable by the manipulation of hydraulic or electric controls. An example of such a wheelchair is described in U.S. Pat. No. 3,618,968, entitled "Patient Operated Wheelchair". This wheelchair has front and rear caster wheels for stability and two centrally mounted large drive wheels for patient locomotion. It is adjustable hydraulically, and may be converted into a stretcher, in which case the weight is borne by the rear casters. The front and rear casters do not contact the ground at the same time. Such wheelchairs have the disadvantage of restricted portability attributed to the added weight of the adjustment mechanism.

More recently, wheelchairs have been made with aircraft alloys, racing bicycle components, and the like, utilizing polymers and composite materials, and features such as raked wheels, to achieve lighter, faster, and more stable manually propelled wheelchairs. These chairs and their users have improved the general perception of wheelchairs and the handicapped. Such wheelchairs, while representing significant improvements in wheelchair technology in their own right, do not readily lend themselves to use in performing many routine but nevertheless necessary domestic functions. Their stability despite their light weight is attained at the expense of a wider wheelbase, greater length, and a lower seating position that is not well suited for mobility around the home and work place.

Those who have used conventional wheelchairs, and those who have observed handicapped persons attempt to use wheelchairs in spaces not designed for them, are aware that the large drive wheels often limit the choice of passageways which are accessible to the wheelchair user, especially on airplanes and in restaurants. Even in a barrier-free environment, unassisted maneuvering from a conventional wheelchair to a toilet can be a daunting task.

U.S. Pat. No. 3,887,228 describes a kit for converting a folding lawn chair into a wheelchair. This results in an extremely lightweight, highly portable wheelchair. The drawbacks of the resulting wheelchair are associated with the inherent design characteristics of these familiar backyard lawn chairs. For example, the integral arm rests which are structurally required to support the chair frame prevent the handicapped user from sliding sideways from the chair to the bed or the toilet. Another drawback of the lawn chair is that it tends to collapse if the user attempts to place his or her weight upon the backrest for support while standing.

Conventional wheelchairs require a vigorous lifting of the seat to fold. While this motion is relatively simple for a strong adult who is standing, it is virtually impossible for the handicapped wheelchair user to accomplish without assistance.

Lightweight, collapsible, inexpensive, transportable chairs with wheels have been designed for use as infant strollers. The inherent characteristics of these chairs makes them unsuitable for adaptation as wheelchairs even for small adults. Such wheelchairs are designed to support only light loads. Furthermore, the foldable frames have centers of gravity located over the rear wheels to make it easier for one pushing the wheelchair to negotiate curbs and stairs. This makes it difficult, if not impossible, for the chair to be manually self-propelled.

Many handicapped people are, or may with rehabilitation become, at least partially ambulatory. Self-reliance and independence is an extremely important aspect of the rehabilitation process and, to the extent further rehabilitation is not possible, of living with the handicap. It is to this need that the present invention is directed.

SUMMARY OF THE INVENTION

This invention is a small, lightweight, multi-use, inexpensive wheelchair that permits a user, handicapped or not, to assemble and disassemble it without assistance while the user is in a seated position. The wheelchair has large quick-release drive wheels by which the handicapped user can propel the chair in the conventional manner, and which permit an assistant to push and guide the wheelchair by means of the back handles. It has conventional hand brakes for the drive wheels, but any functional braking system may be used. The wheel mount may take the form of a boss or hub, permitting the use of lightweight releasable wheels of the type used for bicycles. The user can be protected from abrasion against the drive wheels by either rigid or flexible removable fenders extending between the seat frame and the back frame of the wheelchair. The wheelchair is preferably armless, and has a lightweight fabric back and seat and an adjustable fabric leg support to reduce the weight and improve foldability.

The wheelchair can be easily disassembled by a handicapped user who is in a seated position near the wheelchair. Each large drive wheel is attached to the wheelchair frame by a quick-release hub. Releasing the hub permits the user to remove each large drive wheel. This substantially decreases the weight of the remainder of the wheelchair, making it easier to lift. The frame can be collapsed by releasing simple frame-brace locks, permitting the side frames to be pressed together. The back frame is formed of two separate handles, which makes it possible to release them separately and then fold them into the seat. The chair can be swivelled on casters and pulled to the seated user to reach its lock releases during the steps of folding.

With the drive wheels removed, the frame can be used in an additional configuration. Because of its resilient front caster wheels and fixed high-friction rear rollers, with the drive wheels removed it is a fully functional caster chair, having a seat, a back, and handles. In this configuration, it is useful in confined spaces such as a bathroom or the aisle of an airliner, and on hard surfaces where movement is easy, such as at a desk or a dining table. The wheelchair tends, as a caster chair, to encourage the user to exercise his or her legs by pushing against the floor, and his or her arms, by pushing and pulling against objects.

The wheelchair is further collapsible for transportation in the rear seat or trunk of a car or the overhead compartment of an airliner. Because the wheelchair can easily be disassembled by the user while seated nearby, it lends itself to use by a handicapped person who can operate an automobile. In its collapsed form, with the drive wheels removed, it is readily placed out of the way in the house, such as under a bed, or in the work place, as in a closet. The wheelchair of the invention is thus adaptable by the user to a variety of uses and needs either during rehabilitation from a temporary disability, or throughout a more permanent disability. The various frame, wheel, and webbing members may be formed of attractive fabrics or of improved materials such as plastics or composites that are lightweight.

BRIEF DESCRIPTION OF THE DRAWINGS

FIG. 1 is a partially exploded perspective view of the wheelchair showing both large drive wheels removed.

FIG. 2 is a perspective view of the wheelchair of FIG. 1, with drive wheels removed, in its fully collapsed configuration.

FIG. 3 is a front view of the wheelchair of FIG. 1 showing the front locking brace assembly in its extended position.

FIG. 4 is a front view of the wheelchair of FIG. 1 showing the front locking brace assembly in its collapsed and folded position.

FIG. 5 is a cross-sectional view of the wheelchair of FIG. 1 at the rib section lines 5—5, showing rear scissor bracing in its extended position.

FIG. 6 is the same cross-section as in FIG. 5, but showing the rear scissor bracing collapsed and fed.

FIG. 7 is a view of the back pivot-lock mechanism of the wheelchair of FIG. 1 in its upright and locked position;

FIG. 8 is a view of the back pivot-lock mechanism of the wheelchair of FIG. 1 in its released position.

FIG. 9 is a cross-sectional view of the back pivot lock along section lines 9—9 of FIG. 8.

FIG. 10 is a perspective view of the leg web shown in phantom in FIG. 1.

FIG. 11 is a perspective view of the seat web shown in phantom in FIG. 1.

DETAILED DESCRIPTION OF THE INVENTION

FIG. 1 is a partially exploded perspective view of the wheelchair showing a large drive wheel removed. In FIG. 1, a rigid first side frame 20 and rigid second side frame 21 are each fabricated of welded lightweight tubular metal. Each side frame 20 and 21 has a front leg 22 and a rear leg 24 securely spaced apart by an upper seat rib 26 and a lower rib 28. The front leg 22 and the rear leg 24 are each further secured to the lower rib 28 by reinforcement brackets 30. Each rear leg 24 has a base 32, into which is inserted an in-line roller 34. Each front leg 22 has a curved base 36. A rotatable front caster 38 is mounted on the base 36 so as to permit the caster 38 to swivel about the axis of the front leg 22.

The upper seat rib 26 of each side frame 20 and 21 includes one or more fender bosses 37 and a brake detent 39. The lower rib 28 of each side frame 20 and 21 includes an axle sleeve 40 to which a large drive wheel 42 is mounted by a quick-release hub 44 of a type that is commercially available. Each drive wheel 42 has a rim 46 and a tire 48.

The side frames 20 and 21 each include a brake sleeve 60 into which a brake pin 62 is inserted. The brake sleeve 60 is connected to a brake 64 having a handle 66 and a pad 68. The application of force to the handle 66 levers the pad 68 to apply braking force to the tire 48 when the brake pin 62 rotates within the brake sleeve 60. The brake 64 is locked in a braking position by engaging it with the brake detent 39 on the upper seat rib 26.

The side frames 20 and 21 each have a back handle 90 pivotally attached to the end of the rear leg 24 opposite to its base by pivot-lock assembly 100, which will be described in greater detail in FIGS. 7-9. FIG. 1 further shows the shaft 92 of the back handle 90 terminating in a U-shaped handgrip 94 that is covered with a foam sleeve 96 slipped over the handgrip 94.

The first side frame 20 is locked in a spaced-apart position from the second side frame 21 by engaging a front locking brace 150 and a rear locking brace 152. The front and rear locking braces 150 and 152 are each attached to the legs 22 and 24 at first leg tab 154 and second leg tab 156 by machine bolts 158 and lock nuts 160. One leg tab 154 or 156 is welded to each leg 22 or 24 between the seat rib 26 and the lower rib 28.

The side frames 21 and 22 are stabilized in their locked position by a front scissor brace 198 and a rear scissor brace 200, attached to rib tabs 202. Each rib 26 and 28 has two rib tabs 202.

A seat web 220 and a leg web 240, both shown in phantom, are attached to the seat ribs 26 of the first side frame 20 and second side frame 21. A back web 260 is attached to the back handles 90 of the first side frame 20 and the second side frame 21. A kick web 270 is attached to the front legs 22 of the first and second side frames 20 and 21. The webs 220, 240, 260 and 270 are all formed of a flexible, durable fabric, secured by any suitable means such as sheet metal screws or the like.

FIG. 2 is a perspective view of the wheelchair of FIG. 1, with drive wheels removed, in its fully collapsed configuration. In FIG. 2, the back handles 90 are released and pivoted parallel to the upper seat rib 26 of each side frame 20 and 21. The first side frame 20 is shown folded with respect to second side frame 21. In its folded position, the wheelchair will stand on its wheels, or may be laid on its side for storage.

FIG. 3 is a front view of the wheelchair of FIG. 1 showing the pivot locking assembly 100 in its extended position. In FIG. 3, the front leg 22 and caster 38 show the first side frame 20 in its fully spaced-apart position with respect to the second side frame 21, and the front locking brace 150 is engaged and unfolded. The rear locking brace 152, which is shown in FIG. 1, is similar to the front locking brace 150. As shown in FIG. 3, the front locking brace 150 includes a first arm 153 and a second arm 155, each made of metal bar stock or the like. A two-piece triangular hinge 157, having a first plate 159, a second plate 161 (not visible in FIG. 3), and a hinge base 162, is held to either side of the first arm 153 by two rivets 164. The end of the first arm 153 extends beyond the hinge base 162 to form a finger 166 that bears a chamfer 168. The first and second hinge plates 159 and 161 are held by a single rivet to the second arm 155, permitting hinged movement of the second arm 155 with respect to the first arm 153. A spring lock 170 is also riveted to the second arm 155 adjacent to the finger 166 on the first arm 153. The spring lock 170 contains a spring 172 and a lock pin 174. The lock pin 174 engages the chamfer 168 of the first arm 153 in the finger 166 when the first arm 153 is fully extended with respect to the second arm 155. When a force is applied to the spring lock 170, as shown by a finger 176 in FIG. 3, the spring lock 170 rotates about a rivet in opposition to the spring 172 to release the lock pin 174 from the chamfer 168, thereby permitting the arms 153 and 155 to fold when the user lifts a lift pin 178 (see FIG. 1).

FIG. 4 is a front view of the wheelchair of FIG. 1 showing the front locking brace 150 in its collapsed and folded position. In FIG. 4, the front leg 22 and caster 38 of the first side frame 20 are in a fully folded position with respect to the second side frame 21, with the front locking brace 150 released and folded.

FIG. 5 is a cross-sectional view of the wheelchair of FIG. 1 at the rib section lines 5—5 of FIG. 1, showing the rear scissor brace 200 in its extended position. In FIG. 5 the upper rib 26, the lower rib 28, the rear leg 24, and the roller 34 of the first side frame 20 show in the fully spaced-apart position with respect to the second side frame 21, and the rear scissor brace 200 is unfolded. The front scissor brace 198, not shown in FIG. 5, is similar to the rear scissor brace 200. As can be seen in FIG. 5, the rear scissor brace 200 is attached to the seat rib 26 and lower rib 28 of each side frame 20 and 21 at a rib tab 202 by machine bolts 204 and lock nuts (not shown) that are attached to the machine bolts 204. The scissor braces 198 and 200 are formed from metal bar stock or the like, and comprise a first upper arm 208 and a second upper arm 210, a first lower arm 212 and a second lower arm 214, each drilled to form an aperture at both ends, and the upper arms 208 and 210 each drilled to form a third aperture. The upper arms 208 and 210 are secured by a machine bolt and lock nut at this third aperture to form a pair of blades 216 and a pair of handles 218, as in a pair of scissors. Each lower arm 212 and 214 is secured to a handle by a machine bolt and lock nut to form the scissor brace which is secured to the rib tabs 202 by machine bolts and lock nuts or the like.

FIG. 6 shows a cross-section of the upper rib 2 and the lower rib 28 and the rear leg 24 and roller 34 of the first side frame 20 in its fully folded position with respect to the second side-frame 21. The rear scissor brace 200 is folded.

FIG. 7 is a view of the back pivot-lock mechanism of the wheelchair of FIG. 1 in its upright and locked position, FIG. 8 is a view of the back pivot-lock mechanism in its released position, and FIG. 9 is a cross-sectional view of the back pivot lock along section lines 9—9 of FIG. 8. In FIGS. 7, 8, and 9 the pivot lock assembly 100 is secured to the rear leg 24 by a pivot strap 102. The rear leg 24 includes a bend 104 near the pivot strap 102 to form the leg 24 into an angle of approximately 165 degrees, and a long shaft 106 that is connected to the bend 104 and a short tubular end 108. A latch plate 110 is welded to the rear leg 24 at the bend 104. Details of the structure appear in FIG. 9, which shows a solid cylindrical pin receiver 112 having a threaded aperture 114 placed in the tubular end of the rear leg 24. A lock pin aperture 116 is drilled in the face of the rear leg 24 adjacent to the latch plate 110, in alignment with the threaded aperture 114. A swivel lock pin 118 is inserted through the lock pin aperture 116 and screwed into the threaded aperture of the pin receiver 112 to form a swivel lock. The tubular portion of the shaft 92 of the back handle 90 of FIG. 1 is lubricated and inserted into a swivel sleeve 120. This permits rotatable motion of the shaft 92 with respect to the swivel sleeve 120. The shaft 92 of the back handle 90 contains a latch 122 that comprises a cylindrical bushing 124 having an exterior diameter that is less than the interior diameter of the shaft 92. A closed end 126 and an open end 128 are spaced from each other by a cylinder wall 130. The cylinder wall 130 is penetrated by a pair of opposing apertures, an oblong aperture 132 and a circular aperture 134. A cylindrical latch slug 136 having a slug aperture 138 extending through the cylinder wall 130 is inserted into the open end of the cylindrical bushing 124 and is spaced from the closed end of the bushing by a coil spring 140 that is fitted into a latch slug bore 142. The opposite end of the latch slug 136 is machined to form a pivot lock pin 144 to engage a lock pin aperture 146 drilled through the latch plate 110. A latch pin 148 is inserted into the slug aperture 138 through the oblong aperture 132 in the shaft 92 of the back handle 90, and is secured to the slug 136 by adhesive or screw threads.

The pivot lock pin 144 is released from the latch plate 110 by moving the latch pin 148 in the oblong aperture 132 in the shaft 92 of the back handle 90. Movement of the latch pin 148 is resisted by the coil spring 140, and is defined by the oblong aperture 132, thereby serving to permit releasing and latching, but not rotation, when the back handle 90 is in a locked position. Rotational movement of the shaft 92 is solely with respect to the swivel sleeve 121, which is secured by brazing or suitable adhesive to the pivot strap 102 to prevent movement of the swivel sleeve 121 with respect to the pivot strap 102. Two collars 120 are welded or otherwise attached to the shaft 92 to inhibit vertical movement of the handles 90. A pivot bolt 190 is passed through the ends of the pivot strap 102 on either side of a pivot bushing 192 that is brazed or otherwise connected to the end of the short tubular end 108. A lock nut or the like (not shown) secures the pivot bolt 190 and pivot strap 102 to the pivot bushing 192.

It can be seen from FIG. 7 that the circular aperture 134 is aligned with the swivel lock pin 118 when the shaft 92 is pivoted about the pivot bolt 190 to an upright position to assume the orientation of FIG. 1. The side frames 20 and 21 and back handles 90 may be made of materials such as high-strength plastics or lightweight metals or rigid composite materials.

FIG. 10 is a perspective view of the leg web 240 that is shown in phantom in FIG. 1. In FIG. 10, the leg web 240 comprises a continuous strip of fabric 242 attached at each end to the seat ribs 26 to form a leg sling 244. The leg sling 244 is reinforced and stiffened by adding a plate 245 to form a footrest 246. A second strip of fabric is sewn to the fabric strip 242 to form a leg retention loop 247 and a pair of straps 248 and 250 having hooks 252 and loops 254 or other types of closure mechanisms. It should be understood that the wheelchair can be folded by a sitting person with or without the drive wheels 42 in place.

FIG. 11 is a perspective view of the seat web 220 shown in phantom in FIG. 1. In FIG. 11, the side edges 222 of the seat web 220 are secured to the upper seat ribs 26 by a plurality of screws 224. The portion of the seat web 220, between its side edges 222, folds between the upper seat ribs 26 when the wheelchair is collapsed.

Referring to FIG. 1, a handicapped person could maneuver himself or herself with the large drive wheels 42 to a bench or front airplane seat (the large drive wheels 42 must be removed to negotiate aisles of most commercial airliners), apply the brakes 64 to stabilize the wheelchair, move from the wheelchair to the bench or front airplane seat, release the brakes 64, remove the large drive wheels 42, and then either sit again in the caster chair that remains or collapse the caster chair for storage. Use of the wheelchair as a caster chair is particularly appropriate in the aisle of an airliner, since the caster chair may be made to clear an aisle that is as narrow as fifteen inches.

Finally, the handicapped person could release the locking braces 150 and 152 and fold the wheelchair with the large drive wheels 42 either in place or first removed.

The description of the invention given here is intended to disclose the best mode known to the inventor for practicing the invention and to enable the practice of the invention by others. It is intended to be illustrative and not limiting, and the scope of the invention should be limited only by the scope of the appended claims and their equivalents.

I claim:

1. A lightweight, multi-purpose, user-collapsible wheelchair comprising:
   a first side frame;
   a second side frame spaced from the first side frame by a collapsible locking brace, each of the first and second side frames mounted on an in-line roller and a rotatable front caster;
   a first back handle pivotally and rotatably attached to the first side frame by a first pivot latch;
   a second back handle pivotally and rotatably attached to the second side frame by a second pivot latch;
   a first drive wheel;
   means for attaching the first drive wheel removably to the first side frame;
   a second drive wheel;
   means for attaching the second drive wheel removably to the second side frame;
   a seat web attached to the first and second side frames to form a seat;
   a back web attached to the first and second back handles to form a seat back; and
   a leg web attached to the first and second side frames to form a leg support, whereby the wheelchair user can remove the drive wheels and fold the wheelchair into a compact configuration without assistance even while seated.

2. The wheelchair of claim 1 wherein each of the pivot latches of each of the back handles comprises:
   a sleeve pivotally attached to the side frame, the sleeve loosely surrounding the back handle thereby permitting rotation of the back handle within the sleeve;
   a swivel lock including means for preventing the back handle from rotating; and
   a pivot lock including means for preventing the back handle and sleeve from pivoting with respect to the side frame.

3. The wheelchair of claim 1 wherein the back handle comprises a shaft ending in a curved handgrip.

4. The wheelchair of claim 1 wherein the first and second removable wheels are each mounted on a leg of each of the side frames adjacent to the back handle.

5. An improved lightweight multi-purpose wheelchair that is collapsible by a user from a seated position, the wheelchair comprising:
   a first side frame;
   a second side frame spaced apart by collapsible bracing from the first side frame;
   a seat web secured to the first and second side frames;
   a leg web secured to the first and second side frame;
   a first back leg connected to the first side frame;
   a first front leg connected to the first side frame;
   a second back leg connected to the second side frame;
   a second front leg connected to the second side frame;
   a first caster wheel connected to the first front leg to support the wheelchair;
   a first roller connected to the first back leg to support the wheelchair;
   a second caster wheel connected to the second front leg to support the wheelchair;
   a second roller connected to the second back leg to support the wheelchair;
   a first pivot latch attached to the first side frame adjacent to the first back leg;

a second pivot latch attached to the second side frame adjacent to the second back leg;

a first back handle pivotally and rotatably attached to the side frame by the first pivot latch;

a second back handle pivotally and rotatably attached to the side frame by the second pivot latch;

a back web secured to the first and second back handles;

a pair of large drive wheels; and a pair of quick-release hubs, one of each of the hubs attached to one of the large drive wheels, whereby the wheelchair user can remove the drive wheels and fold the back handles and webs without the assistance of another.

6. The wheelchair of claim 5 wherein the leg web comprises:

a first web having two ends and a middle, each end of the first web having means for securing the end to a side frame to form a sling, the first web containing a rigid footrest in the middle;

a second web having a central portion attached to the first web between its ends and the footrest forming overlapping ends of the second web; and means for securing the overlapping ends of the second web to form a leg retention band.

7. The wheelchair of claim 6 wherein the first and second back handles each comprises:

a tubular shaft;

a handgrip connected to the tubular shaft;

and wherein the pivot latch comprises a sleeve pivotally attached to the side frame, the sleeve loosely surrounding the tubular shaft thereby permitting rotation of the back handle within the sleeve;

a swivel lock including means for preventing the back handle from rotating; and a pivot lock for preventing the back handle and sleeve from pivoting in relation to the side frame.

8. A wheelchair that can be collapsed and folded by a user and that is adapted to function also as a caster chair, the wheelchair comprising:

a. a first side frame including a front leg, a rear leg, and a lower rib;

b. a second side frame including a front leg, a rear leg, and a lower rib;

c. a front scissor brace connecting the first side frame and the second side frame behind the front legs;

d. a rear scissor brace connecting the first side frame and the second side frame in front of the rear legs;

e. a front locking brace connected to the front legs to permit the front scissor brace to fold and to lock the scissor brace in an unfolded position;

f. a rear locking brace connected to the rear legs to permit the rear scissor brace to fold and to lock the scissor brace in an unfolded position when the front locking brace is operated at the same time;

g. a pair of rotatable front casters, one of each of the front casters connected to one of each of the front legs;

h. a pair of in-line rollers, one of each of the in-line rollers connected to one of the rear legs;

i. a first quick-release hub connected to one of the rear legs;

j. a first large drive wheel releasably connected to the quick-release hub;

k. a second quick-release hub connected to the other rear leg;

l. a second large drive wheel releasably connected to the second quick-release hub;

m. a pair of pivot-lock assemblies, one of each of the pivot-lock assemblies connected to one of the rear legs;

n. a pair of back handles, one of each of the back handles connected to one of the pivot-lock assemblies so as to be locked in an upright position and pivot and rotate into a folded position;

o. a back web connected between the back handles to form a back;

p. a seat web connected to the first and second side frames to form a seat; and q. a foot rest connected to the first and second side frames.

9. An improved lightweight multi-purpose wheelchair that is collapsible by a user from a seated position, the wheelchair comprising:

a first side frame;

a second side frame spaced apart by collapsible bracing from the first side frame;

a seat web secured to the first and second side frames;

a first web having two ends and a middle, each end of the first web having means for securing the end to a side frame to form a sling, the first web containing a rigid footrest in the middle;

a second web having a central portion attached to the first web between its ends and the footrest forming overlapping ends of the second web;

means for securing the overlapping ends of the second web to form a leg retention band;

a first back leg connected to the first side frame;

a first front leg connected to the first side frame;

a second back leg connected to the second side frame;

a second front leg connected to the second side frame;

a first caster wheel connected to the first front leg to support the wheelchair;

a first roller connected to the first back leg to support the wheelchair;

a second caster wheel connected to the second front leg to support the wheelchair;

a second roller connected to the second back leg to support the wheelchair;

a first pivot latch attached to the first side frame adjacent to the first back leg;

a second pivot latch attached to the second side frame adjacent to the second back leg;

a first back handle pivotally and rotatably attached to the side frame by the first pivot latch;

a second back handle pivotally and rotatably attached to the side frame by the second pivot latch;

a back web secured to the first and second back handles;

a pair of large drive wheels; and a pair of quick-release hubs, one of each of the hubs attached to one of the large drive wheels, whereby the wheelchair user can remove the drive wheels and fold the back handles and webs without the assistance of another.

10. The wheelchair of claim 9 wherein the first and second back handles each comprises:

a tubular shaft;

a handgrip connected to the tubular shaft;

and wherein the pivot latch comprises a sleeve pivotally attached to the side frame, the sleeve loosely surrounding the tubular shaft thereby permitting rotation of the back handle within the sleeve;

a swivel lock including means for preventing the back handle from rotating; and a pivot lock for preventing the back handle and sleeve from pivoting in relation to the side frame.

* * * * *

UNITED STATES PATENT AND TRADEMARK OFFICE
CERTIFICATE OF CORRECTION

PATENT NO. : 5,188,383

DATED : October 3, 1991

INVENTOR(S) : Josephine M. Thompson

It is certified that error appears in the above-identified patent and that said Letters Patent is hereby corrected as shown below:

Column 4, line 14, delete "fed." and insert therefor -- folded --.
Column 6, line 21, delete "2" and insert therefor -- 26 --.
Column 8, line 11, delete "privotally" and insert therefor -- pivotally --.

Signed and Sealed this

Twenty-third Day of November, 1993

Attest:

BRUCE LEHMAN

Attesting Officer     Commissioner of Patents and Trademarks